(12) United States Patent
Ikegaya

(10) Patent No.: US 9,605,624 B2
(45) Date of Patent: Mar. 28, 2017

(54) BLOW-BY GAS TREATMENT DEVICE FOR INTERNAL COMBUSTION ENGINE

(71) Applicant: NISSAN MOTOR CO., LTD., Yokohama-shi, Kanagawa (JP)

(72) Inventor: Kiyoshi Ikegaya, Tokyo (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/903,432

(22) PCT Filed: Jun. 10, 2014

(86) PCT No.: PCT/JP2014/065292
§ 371 (c)(1),
(2) Date: Jan. 7, 2016

(87) PCT Pub. No.: WO2015/015907
PCT Pub. Date: Feb. 5, 2015

(65) Prior Publication Data
US 2016/0160802 A1    Jun. 9, 2016

(30) Foreign Application Priority Data

Jul. 31, 2013  (JP) ................................ 2013-158382

(51) Int. Cl.
*F01M 13/04*    (2006.01)
*F02M 25/06*    (2016.01)
(Continued)

(52) U.S. Cl.
CPC ............ *F02M 25/06* (2013.01); *F01M 11/08* (2013.01); *F01M 13/022* (2013.01);
(Continued)

(58) Field of Classification Search
CPC ............. F02M 25/06; F02M 35/10222; F02M 35/1261; F02M 35/1288; F02M 35/06;
(Continued)

(56) References Cited

U.S. PATENT DOCUMENTS

| 2003/0136386 A1* | 7/2003 | Itakura | ................ F02M 25/06 123/520 |
| 2010/0071676 A1* | 3/2010 | Arvan | ................ F01M 13/0405 123/573 |
| 2014/0352674 A1* | 12/2014 | Bellis | ................ F02M 35/024 123/573 |

FOREIGN PATENT DOCUMENTS

| JP | S64-12051 A | 1/1989 |
| JP | H07-301165 A | 11/1995 |

(Continued)

*Primary Examiner* — Marguerite McMahon
(74) *Attorney, Agent, or Firm* — Drinker Biddle & Reath LLP

(57) ABSTRACT

A resonator (12) for reducing intake air noise is connected to an intake air duct (6) connecting a throttle chamber (5) and an air cleaner case (7). This blow-by gas treatment device is equipped with a fresh air introduction passage comprising a fresh air introduction hose (16), and a blow-by gas passage comprising a blow-by gas hose (20), with the fresh air introduction hose (16) connecting a cylinder head cover (4) and the resonator (12). A connector part (15) of the resonator (12) to which the fresh air introduction hose (16) is connected is provided with an orifice (21) formed integral with a lower body (13) formed of a synthetic resin, as a part thereof. Pulsation is effectively reduced by the throttling effect of the orifice (21) and the expansion effect of the resonator (12).

3 Claims, 4 Drawing Sheets

(51) Int. Cl.
  *F01M 11/08*   (2006.01)
  *F02M 35/10*   (2006.01)
  *F02M 35/12*   (2006.01)
  *F01M 13/02*   (2006.01)

(52) U.S. Cl.
  CPC ...... *F01M 13/028* (2013.01); *F01M 13/0416* (2013.01); *F02M 35/10222* (2013.01); *F02M 35/1261* (2013.01); *F02M 35/1288* (2013.01); *F01M 2013/0488* (2013.01); *Y02T 10/121* (2013.01)

(58) Field of Classification Search
  CPC ......... F02M 2013/0488; F01M 13/022; F01M 13/028; F01M 11/08; F01M 13/0416; Y02T 10/121
  USPC ............................................ 123/572, 184.57
  See application file for complete search history.

(56) References Cited

FOREIGN PATENT DOCUMENTS

| | | |
|---|---|---|
| JP | 2006-250080 A | 9/2006 |
| JP | 2009-257117 A | 11/2009 |
| JP | 2010-096028 A | 4/2010 |
| JP | 2012-021491 A | 2/2012 |
| JP | 2012-241561 A | 12/2012 |
| JP | 2013-107599 A | 6/2013 |
| JP | 2013-113109 A | 6/2013 |

\* cited by examiner

BLOW-BY GAS TREATMENT DEVICE FOR INTERNAL COMBUSTION ENGINE

TECHNICAL FIELD

The present invention relates to an improvement of a blow-by gas treatment device for an internal combustion engine, the device being so adapted that brow-by gas in a crankcase of an internal combustion engine is led into an air intake system and then burned in a combustion chamber.

BACKGROUND OF THE INVENTION

In Patent Document 1, there is disclosed a brow-by gas treatment device for an internal combustion engine, the device comprising a fresh air introduction passage for introducing a fresh air into a crankcase from the upstream side (with respect to a throttle valve) of an intake air passage and a blow-by gas passage for emitting blow-by gas from the crankcase into the downstream side (with respect to the throttle valve) of the intake air passage. One end of the fresh air introduction passage is connected to between the throttle valve of the intake air passage and an air flow meter disposed upstream therefrom.

In the thus constructed blow-by gas treatment device, a fresh air is introduced into the crankcase by a difference in pressure between upstream and downstream from the throttle valve while a blow-by gas is introduced toward the downstream side of the throttle valve together with this fresh air, and finally a combustion treatment is initiated in a combustion chamber. In a high-speed high-load region where a difference in pressure between upstream and downstream from the throttle valve is small and the generated amount of blow-by gas is large, the blow-by gas flows backwardly through the fresh air introduction passage to be introduced to the upstream side of the throttle valve.

With consideration given to the backflow of blow-by gas in the fresh air introduction passage, Patent Document 2 discloses an arrangement where an oil separator for the fresh air introduction passage and an oil separator for the blow-by gas passage are provided inside a cylinder head cover of an internal combustion engine and the tip end of the fresh air introduction passage and that of the blow-by gas passage are respectively connected thereto.

In such an arrangement where the fresh air introduction passage is connected to between the throttle vale of the intake air passage and the air flow meter, a periodical change in pressure within the crankcase or a pressure pulsation of blow-by gas is apt to propagate to the intake air passage side through the fresh air introduction passage, which makes the air flow meter cause an error in measuring the amount of intake air. Particularly in the case of using a highly responsive air flow meter, an influence of pulsation of blow-by gas is outstandingly exhibited in a low load region (for example, in an idle state) where the amount of intake air is small.

REFERENCES ABOUT PRIOR ART

Patent Documents

Patent Document 1: Japanese Patent Application Publication No. 2010-96028
Patent Document 2: Japanese Patent Application Publication No. 2013-113109

SUMMARY OF THE INVENTION

An aspect of the present invention resides in a blow-by gas treatment device for internal combustion engine which device is equipped with a fresh air introduction passage leading from the upstream side of a throttle valve of an intake air passage to an interior of a crankcase and a blow-by gas passage leading from the interior of the crankcase to the downstream side of the throttle valve of the intake air passage, wherein a resonator is connected to between the throttle valve of the intake air passage and an air flow meter disposed on the upstream side therefrom while one end of the fresh air introduction passage is connected to the resonator, and there is provided an orifice at a connected section of the fresh air introduction passage and the resonator.

The resonator is connected to the intake air passage, as the so-called Helmholtz type resonator element, to contribute to a reduction of intake air noise. The fresh air introduction passage is arranged to communicate with the intake air passage through the resonator, so that a fresh air is to flow from the intake air passage through the resonator into the fresh air introduction passage. Meanwhile, at the time when blow-by gas flows backwardly in a high load region, the blow-by gas is to flow from the fresh air introduction passage through the resonator into the intake air passage.

In the present invention, an orifice is provided at the fresh air introduction passage or at a connected section disposed between of the fresh air introduction passage and the resonator, thereby producing a throttling effect. With this, a pressure pulsation which tends to propagate from the crankcase side to the intake air passage side is reduced. In particular, since the orifice is provided at a location immediately before the resonator where the volume is increased and therefore a gas throttled at the orifice is expanded abruptly at the resonator, a pressure pulsation is more effectively reduced by such an expansion effect.

According to the present invention, it is possible to suppress a pressure pulsation which tends to propagate through the fresh air introduction passage to the upstream side of the intake air passage with respect to the throttle valve, thereby reducing an error of the air flow meter in measuring the amount of intake air.

MODE(S) FOR CARRYING OUT THE INVENTION

Referring now to the accompanying drawings, an embodiment of the present invention will be discussed in detail.

Figure 1:
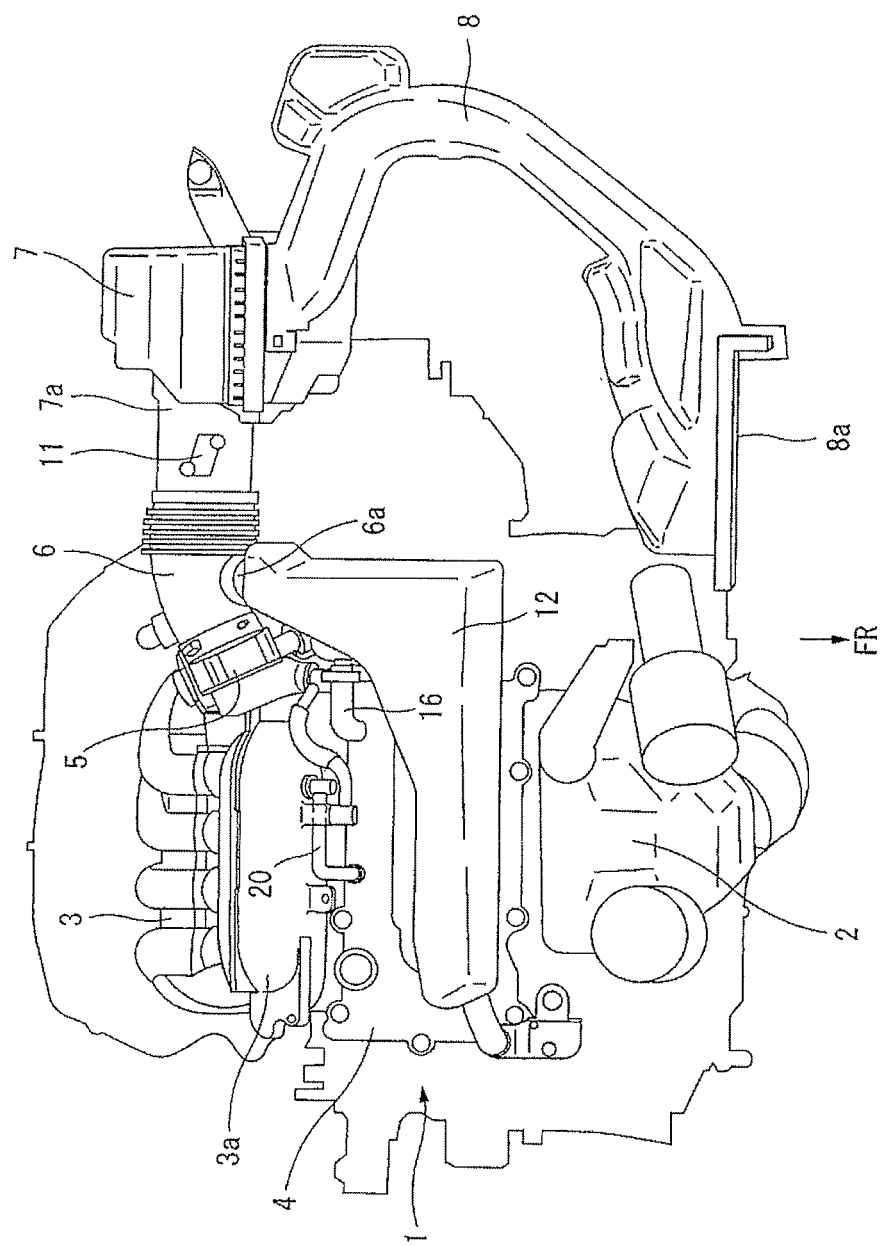
FIG. 1 A plan view of the whole of an internal combustion engine equipped with a blow-by gas treatment device according to the present invention.

FIG. 1 is a plan view showing an automotive internal combustion engine 1 equipped with a brow-by gas treatment device according to the present invention, including an air intake system. The internal combustion engine 1 is mounted in an engine compartment disposed on the front side of a vehicle, in the so-called transverse posture (or an arrangement bringing the center axis of a crank shaft into line with the vehicle width direction). An exhaust manifold 2 is located on the front side of the vehicle (indicated in the drawing by "FR") while an intake manifold 3 is located on the rear side of the vehicle. A collector portion 3a serving as a part of the intake manifold 3 is disposed adjacent to a cylinder head cover 4 on the rear side of the vehicle from the cylinder head cover 4. The collector portion 3a has an inlet portion at one longitudinal end, to which a throttle chamber 5 is connected. The throttle chamber 5 is provided having a throttle valve in its interior (though not shown).

To an upstream end of the throttle chamber 5 one end of an intake air duct 6 formed of a flexible material such as rubber, synthetic resin and the like is connected, while the other end of the intake air duct 6 is connected to a cylindrical-shaped outlet pipe 7a of an air cleaner case 7. An inlet side of the air cleaner case 7 is connected to an outside-air introduction duct 8 formed of a relatively hard synthetic resin material. The outside-air introduction duct 8 is formed to open toward the front of the vehicle, at tip end opening 8a. In the air cleaner case 7, an air cleaner element is housed to divide the so-called dust side on which the outside-air introduction duct is connected and the so-called clean side on which the intake air duct 6 is connected from each other, though not shown.

To the outlet pipe 7a, a heat wire air flow meter 11 for measuring an amount of intake air is attached. In other words, the air flow meter 11 is located on the upstream side from the throttle valve.

Above the cylinder head cover 4, a resonator 12 constituting a Helmholtz type resonance chamber for reducing intake air noise is disposed. The resonator 12 roughly has a shape of a triangle or a letter L slenderly extending in the vehicle width direction in a plan view of the vehicle, and located overlapping the top surface of the cylinder head cover 4.

Figure 2:
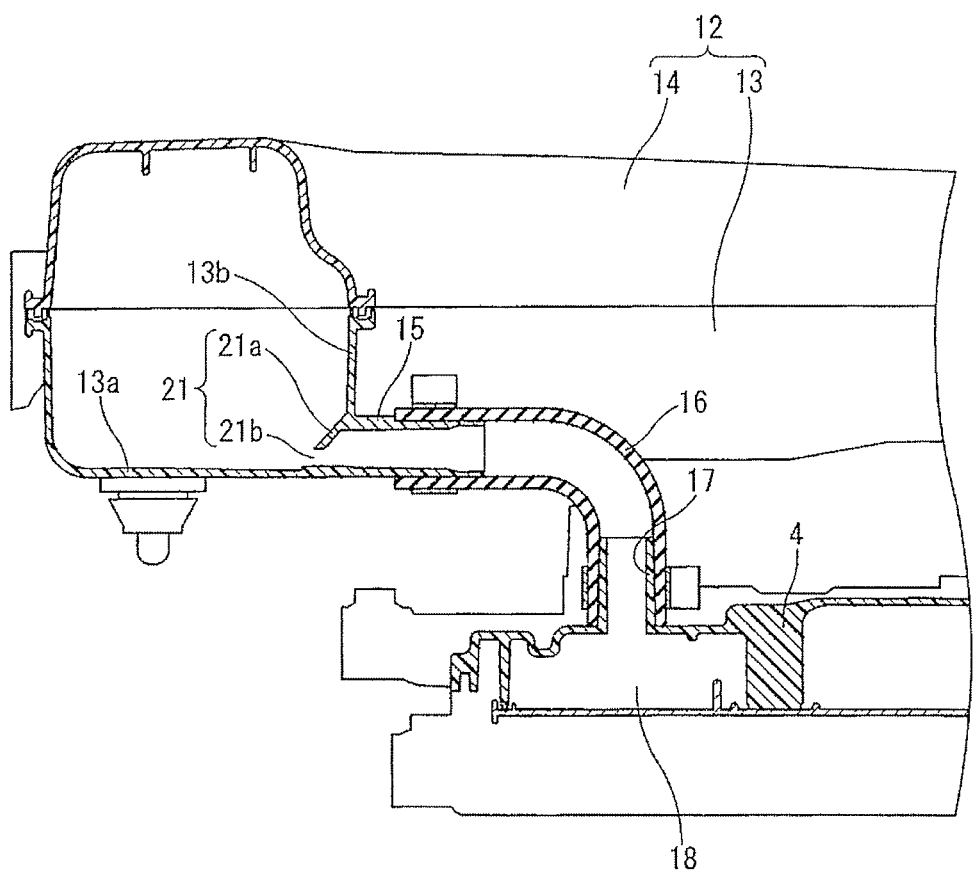
FIG. 2 A cross-sectional view showing a cross section of an essential part of a resonator.
Figure 3:
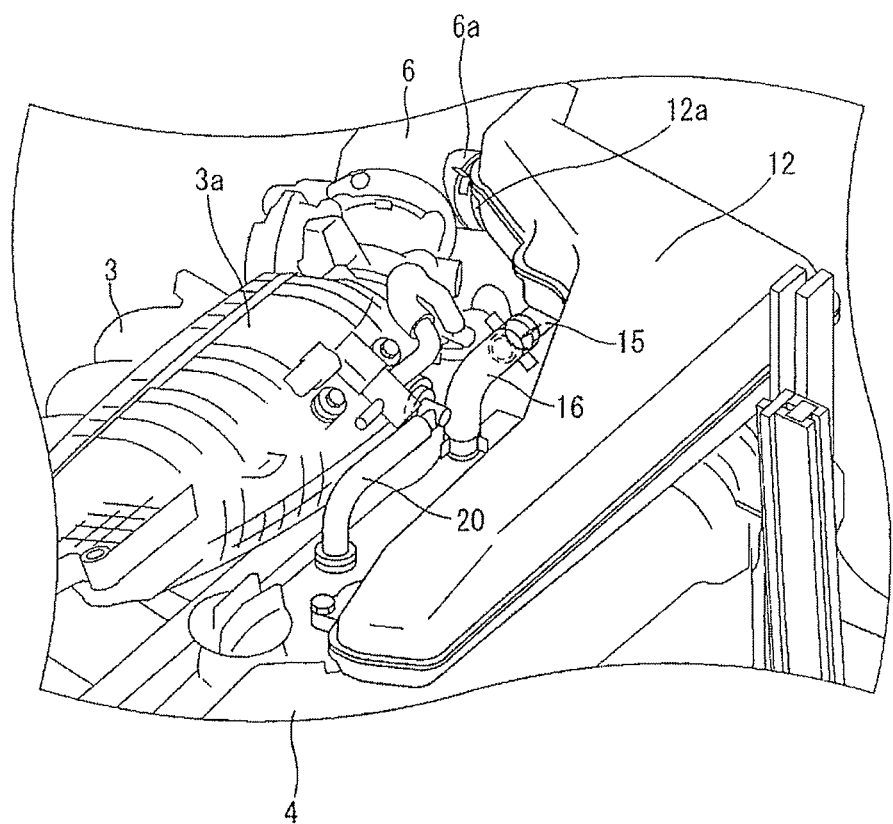
FIG. 3 A perspective view showing an essential part.

As shown in FIG. 2, the resonator 12 has a simple hollow shape which can vertically be divided into a lower body 13 and an upper body 14, each of which comprises an injection molded article of a hard synthetic resin and joined integral with each other by vibration welding or the like. Additionally, the resonator 12 is provided with a neck tube part 12a at one longitudinal end portion adjacent to the intake air duct 6 as shown in FIG. 3, and the neck tube part 12a is connected to a branch pipe section 6a of the intake air duct 6. In other words, the internal content of the resonator 12 is arranged to communicate with an intake air passage defined inside the intake air duct 6 (more specifically, between the throttle valve and the air flow meter 11) through the neck tube part 12a, so that the effect of reducing intake air noise is obtained within a certain band. The neck tube part 12a is formed integral with the lower body 13.

Figure 4:
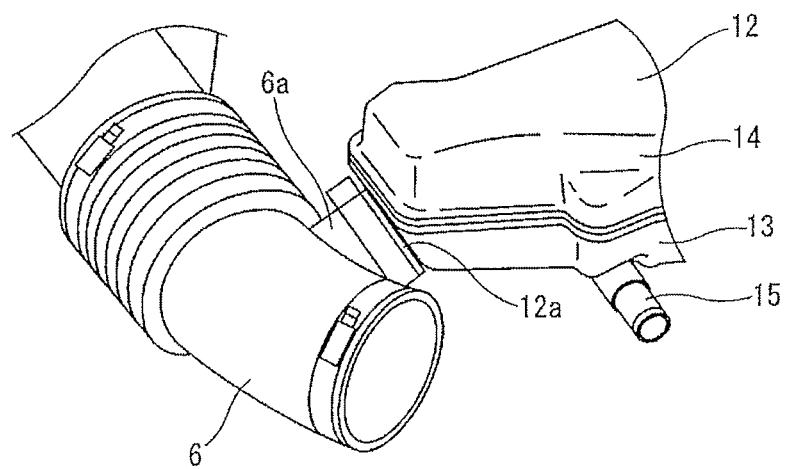
FIG. 4 A perspective view showing a connected section of an intake air duct and the resonator.

The lower body 13 is further formed integral with a connector part 15 for a fresh air introduction passage at a position relatively close to the neck tube part 12a, as shown in FIGS. 2 to 4. The connector part 15 is so formed as to cylindrically protrude toward the inside of the triangular or L-like shape of the resonator 12 and extend along a flat bottom wall 13a of the lower body 13 as shown in FIG. 2. Namely, the connector part 15 is provided at the lowermost position of the resonator 12 in a vehicle-mounted state. To the connector part 15, one end of a fresh air introduction hose 16 formed of rubber and constituting a part of the fresh air introduction passage is connected. The fresh air introduction hose 16 is provided extending downward to be shaped generally into a letter L, and connected at its other end to a connector section 17 provided to the top surface of the cylinder head cover 4 as shown in FIG. 2. Inside the cylinder head cover 4, there is formed an oil separator 18 for the fresh air introduction passage. The fresh air introduction passage is arranged to communicate with the interior of a crankcase through the oil separator 18 (though not shown).

Moreover, to the top surface of the cylinder head cover 4, one end of a blow-by gas hose 20 formed of rubber and constituting a part of a blow-by gas passage is also connected. The other end of the blow-by gas hose 20 is connected to the collector portion 3a of the intake manifold 3 through a PCV valve (though not shown). Also concerning the blow-by gas hose 20, there is formed a further oil separator inside the cylinder head cover 4 (though not shown). The blow-by gas passage is arranged to communicate with the interior of the crankcase through this not-illustrated oil separator.

Figure 5:
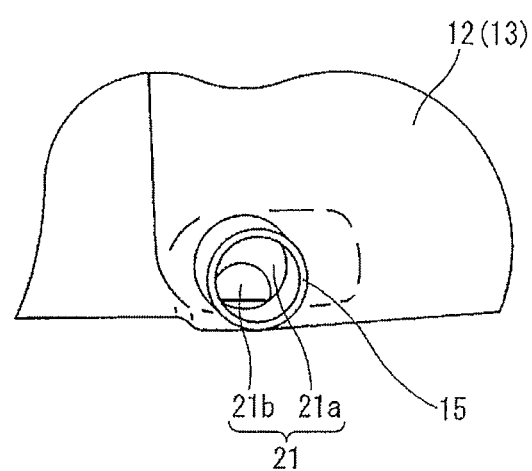
FIG. 5 A front view of an essential part, showing a connector part of the resonator.

In the present embodiment, the resonator 12 is formed integral with an orifice 21 for reducing a pressure pulsation, at the connector part 15. More specifically, as shown in FIGS. 2 and 5, the orifice 21 is provided including a partition wall 21a extending along an inner wall surface of the lower body 13 and an orifice hole 21b formed opening at the partition wall 21a, and formed at the same time of forming the cylindrical connector part 15 by a slide core. The partition wall 21a extends along an arcuate plane that smoothly links the bottom wall 13a and a side wall 13b of the lower body 13 so that the orifice hole 21b is defined opening at a downwardly biased position of the cylindrical-shaped connector part 15, the orifice hole 21b having a diameter smaller than the inner diameter of the connector part 15. The lowermost edge of the orifice hole 21b is substantially coincident with the surface of the bottom wall of the lower body 14.

Though the orifice hole 21b in the present embodiment is a noncircular hole when viewed in the axial direction of the connector part 15 (to be more specific, a hole the outer edge of which is formed to have an inversed U-shape) for convenience in shaping, it will be understood that a perfectly circular hole is also acceptable. In one embodiment, the connector part 15 has an inner diameter of 12 mm while the orifice hole 21b has an equivalent diameter of about 7 mm. Incidentally, it is also possible to obtain the orifice hole 21b by secondary machining upon forming the partition wall 21a of a synthetic resin material.

In the above-mentioned structure, the brow-by gas treatment device is constituted mainly of: the fresh air introduction passage comprising the fresh air introduction hose 16; and the brow-by gas passage comprising the blow-by gas hose 20. In a low to medium load region where a difference in pressure is sufficiently caused between upstream and downstream from the throttle valve, a fresh air is introduced from the upstream side of the throttle valve into the crankcase of the internal combustion engine 1 by way of the resonator 12. A blow-by gas that resides in the crankcase is introduced into the collector portion 3a through the blow-by gas passage, together with the thus introduced fresh air. As an aside, the amount of blow-by gas is suitably adjusted by the not-illustrated PCV valve at this time. Meanwhile, in a high-speed high-load region where a difference in pressure between upstream and downstream from the throttle valve is small and the generated amount of blow-by gas is large, the blow-by gas mainly flows through the fresh air introduction passage backwardly to be introduced to the upstream side of the throttle valve.

The fresh air introduction passage always communicates the crankcase with the intake air passage at the upstream side from the throttle valve and therefore a periodical change in pressure within the crankcase or a pressure pulsation of blow-by gas is apt to propagate to the intake air passage side through the fresh air introduction passage; however, in the above-mentioned construction, the connector part 15 serving as a part of the fresh air introduction passage is provided with the orifice 21, and the throttling effect thereof reduces the pressure pulsation propagating to the intake air passage side. In particular, the orifice 21 is provided at a location immediately before the large content of the resonator 12, with which gas having passed through the orifice hole 21b can abruptly expand. By the expansion effect, the pressure pulsation can more effectively be reduced.

Accordingly an error in measuring the amount of intake air, caused by the pressure pulsation of blow-by gas at the air flow meter 11 can be reduced.

The opening are of the orifice hole 21b is required to suitably be determined because an excessively large one impairs the pulsation-reducing effect while an excessively small one accelerates the progress of oil deterioration due to blow-by gas that resides in the crankcase. In this regard, the above-mentioned construction of the present embodiment is arranged to provide the orifice 21 as a part of the resonator 12 (designed according to each model in usual, separately from the internal combustion engine 1 itself), thereby facilitating tuning of each model. In the present embodiment, furthermore, the orifice 21 is formed integral with the resonator 12 formed of a synthetic resin. It is therefore possible to promote the reduction of pulsation without increasing the number of components and without increasing an actual cost.

On the other hand, the resonator 12 also functions as an oil-recovering volume chamber where oil mist having attended blow-by gas is separated and recovered (i.e., the so-called catch tank) in addition to the intake air noise-reducing action. More specifically blow-by gas which is to backwardly flow through the fresh air introduction passage in a high-speed high-load region as mentioned above contains oil mist that resides in the crankcase; as a result of the blow-by gas decreasing its flow velocity within the resonator 12, the oil mist is separated and recovered in the form of droplets into the resonator 12. Then, the oil collected at the bottom of the resonator 12 is to flow toward the cylinder head cover 4 through the fresh air introduction hose 16, and finally come back into the crankcase.

In the present embodiment, the connector par 15 of the fresh air introduction hose 16 is connected to the bottom of the resonator 12 and the orifice hole 21b is defined opening at a downwardly biased position of the connector part 15 so as to have a height equal to the surface of the bottom wall of the lower body 13. Hence oil collected within the resonator 12 can flow without a hitch through the orifice hole 21b. In other words, the provision of the orifice hole 21b never adversely affects the recovery of oil.

Although the invention has been described above by reference to one embodiment, the invention is not limited to the embodiment described above and various modifications thereof will be acceptable. For example, though in the above-discussed embodiment both the fresh air introduction passage and the blow-by gas passage are connected to the cylinder head cover 4, the present invention is also applicable to a blow-by gas treatment device having such an arrangement as to connect these passages to the crankcase in the vicinity of a skirt portion of a cylinder block etc.

The invention claimed is:

1. A blow-by gas treatment device for internal combustion engine which device is equipped with a fresh air introduction passage leading from the upstream side of a throttle valve of an intake air passage to an interior of a crankcase and a blow-by gas passage leading from the interior of the crankcase to the downstream side of the throttle valve of the intake air passage, wherein a resonator is connected between the throttle valve of the intake air passage and an air flow meter disposed on the upstream side therefrom while one end of the fresh air introduction passage is connected to the resonator, the resonator is provided to have a connector part to which a pipe serving as the fresh air introduction passage is connected, and an orifice is formed at the connector part, the resonator is formed with the connector part at its lower position in a vehicle-mounted posture so that oil separated from blow-by gas is brought back toward the crankcase through the fresh air introduction passage.

2. A blow-by gas treatment device for internal combustion engine, as claimed in claim 1, wherein the resonator comprises a synthetic resin molded article, and the connector part is formed as a part of the resonator while the orifice is formed integral with the connector part.

3. A blow-by gas treatment device for internal combustion engine, as claimed in claim 1, wherein the orifice opens biasedly toward a lower side of the cylindrical-shaped connector part.

* * * * *